Sept. 1, 1931. P. S. BOGATZ 1,821,374
CORN HARVESTER
Filed Oct. 22, 1928
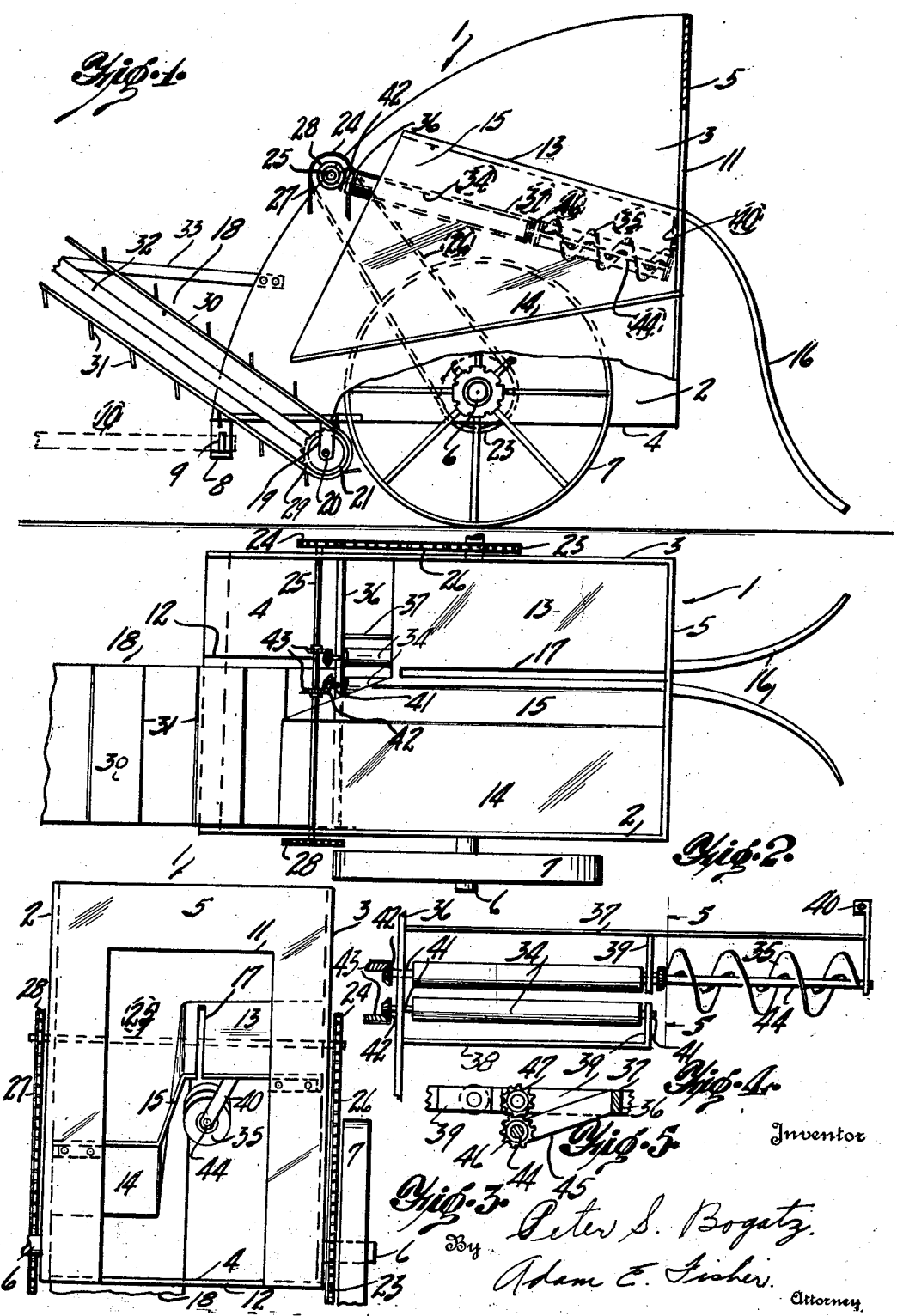

Patented Sept. 1, 1931

1,821,374

UNITED STATES PATENT OFFICE

PETER S. BOGATZ, OF OMAHA, NEBRASKA

CORN HARVESTER

Application filed October 22, 1928. Serial No. 314,068.

This invention relates to agricultural implements and more particularly to a machine for harvesting corn in the field.

The main object of the invention is to provide a harvester which may be fastened to a motor truck or like vehicle and which when driven forward over the field will snap the ears of corn from the stalks and deliver the same to the truck.

A further object of the invention is the provision of such a machine in a simple and durable form which may be readily constructed to harvest one, or two or more rows of corn simultaneously.

The foregoing and other objects together with means whereby the same are carried into effect will best be understood from the following description of a preferred embodiment of the invention, taken in connection with the accompanying drawings thereof, in which:

Figure 1 is a side view of the invention, partially broken away.

Figure 2 is a plan view thereof.

Figure 3 is a front view thereof also partially broken away.

Figure 4 is a plan view of the suspension and driving means for the rollers and spiral conveyor.

Figure 5 is an enlarged section along the line 5—5 in Figure 4.

Referring now more particularly to the drawings, the reference character 1 denotes a frame comprising the spaced sides 2 and 3 connected by a bottom 4 and front 5, the upper and rear margins of the sides 2 and 3 being curved or convexed as shown. Short stub axles 6 are extended laterally from the sides 2 and 3 adjacent their lower margins and support wheels 7 are journaled upon the outer ends of these axles. A cross member 8 is provided with suitable tongue receiving pins one of which is shown at 9 over which may be placed the tongue 10 which extends forwardly from the driving truck (not shown) and by means of which the machine is caused to travel over the ground. A rectangular aperture 11 is provided in the front 5 and a slot 12 is formed in the bottom 4, the arrangement being such that when the machine is driven over the field astraddle the rows of corn, the stalks will pass through the machine in substantially a vertical or upright position so that they may be acted upon by the various harvesting instrumentalities to be described.

An ear snapping plate is provided, comprising the upper forwardly sloping portion 13 and the lower rearwardly sloping chute 14 connected by an inclined trapezoidal connecting portion 15, the entire plate being secured to the side and front by its margins as shown. Downwardly curving and forwardly diverging gathering arms 16 are secured to the forward margin of the upper portion 13 of the ear snapping plate, the purpose of these arms being to raise up fallen or leaning stalks so that they will enter the machine. A longitudinal slot 17 open at its forward end, is provided in the upper portion 13 of the ear snapping plate in alignment with the converged or rear spaced ends of the gathering arms 16 in such manner that the stalks will enter this slot. Due to the forward motion of the machine and the slope of the slot 17 the ears of corn will be pulled or snapped from the stalks since they cannot pass through the said slot 17 as will be understood. The ears thus snapped from the stalks will fall down into the chute 14 and slide backward therein onto an elevator 18 which is directed rearwardly and upwardly so that the ears will be delivered clear of the machine into the following truck.

This elevator 18 comprises the depending hangers 19 through which is journaled the elevator shaft 20 to receive the elevator driving roller 21. A sprocket 23 is secured to one of the wheels 7 and a sprocket wheel 24 is secured to one end of a drive shaft 25 journaled through the sides 2 and 3, a sprocket chain 26 being trained around these sprockets. A similar sprocket chain 27 is trained over a sprocket 28 on the opposite end of the drive shaft 25 and a sprocket 29 on the elevator shaft 20 so that as the machine travels forward the elevator driving roller 21 will be rotated. An elevator belt 30 having cleats 31 extended outward from its face is mounted over this roller 21 and an idler roller (not shown) which is journaled in the ends of the elevator frame 32 as will be understood. A brace 33 serves to retain the elevator assembly in the proper angular or inclined position. In order to facilitate the drawing in of the stalks into the machine I provide the rollers 34 and spiral conveyor 35. A cross bar 36 is secured between the sides 2 and 3 adjacent the drive shaft 25 and a forwardly extending side bar 37 is secured to this cross bar at a point spaced to one side from the slot 17 in the ear snapping plate. A similar but shorter side bar 38 is secured upon the cross bar 36 spaced laterally from the said bar 37 and each of these bars 37 and 38 are provided with inwardly directed arms 39 terminating short of each other as shown to leave a passageway for the stalks of corn as they enter the machine. The frame comprising the elements just recited is mounted immediately below the slot 17 sloping downwardly and forwardly as shown and the forward end is supported by means of a hanger 40 secured to the upper portion 13 of the ear snapping plate. The rollers 34 are journaled by their axles 41 in spaced relationship between the cross bar 36 and arms 39, the said axles 41 projecting outwardly beyond these elements at their ends as shown. Beveled pinions 42 are secured upon the rear extended ends of the axles 41 and beveled gears 43 are mounted upon the drive shaft 25 in mesh with these pinions. The gears 43 are oppositely positioned as shown so that the rollers will turn in opposite direction, the arrangement being such that these rollers will pull the stalks of corn through the slot 17, snapping off the ears. In this manner broken stalks will be pulled through the slot as well as the standing stalks as will be understood.

The spiral conveyor 35 is journaled by its shaft 44 between the hanger 40 and an arm 45 extended from the side bar 37 and is provided at its rear end with a gear 46 with which meshes a gear 47 on the end of one of the roller axles 41. This conveyor is of conventional type and as shown in Figure 3 is hung slightly off center so that it will engage the stalks of corn and draw them into the machine.

The use and operation of the device will be apparent from the foregoing and it will be readily understood that the device may be caused to travel over the field by other means than that set forth and also that the machine may be constructed to harvest two rows of corn simultaneously.

While I have herein set forth a certain preferred embodiment of my invention it is understood that I may vary from the same in minor structural details so as best to construct a pratical device, not departing from the spirit of the invention and within the scope of the appended claims.

I claim:

1. In a device of the kind described, a wheel borne frame, a forwardly sloping ear snapping plate mounted in the frame, the said ear snapping plate having a longitudinal stalk receiving slot, a pair of rollers mounted beneath the ear snapping plate adjacent the rear thereof, a spiral conveyor mounted beneath the ear snapping plate forwardly of the said rollers, and means for rotating the spiral conveyor and rollers whereby the conveyor will draw stalks inward into engagement with the rollers.

2. In a device of the kind described, a wheel borne frame, a forwardly sloping ear snapping plate mounted in the frame, the said plate having a longitudinally extended slot open at its forward end, gathering arms forwardly and downwardly extended from the ear snapping plate at each side of the slot and diverging therefrom, a pair of rollers rotatably mounted directly beneath and in parallelism with the rear portion of the slot in the ear snapping plate, a spiral conveyor rotatably mounted beneath the ear snapping plate in parallelism with and laterally offset from the forward portion of the said slot, and means for rotating the said rollers and conveyor.

In testimony whereof I affix my signature.

PETER S. BOGATZ.